United States Patent
Liang et al.

(10) Patent No.: US 10,122,673 B2
(45) Date of Patent: Nov. 6, 2018

(54) METHODS AND SYSTEMS FOR AGGREGATING USER GENERATED CONTENT

(71) Applicant: TENCENT TECHNOLOGY (SHENZHEN) COMPANY LIMITED, Shenzhen (CN)

(72) Inventors: Zhu Liang, Shenzhen (CN); Xiaojun Huang, Shenzhen (CN); Qinxue Li, Shenzhen (CN); Shanshan Wang, Shenzhen (CN); Liying Sun, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 163 days.

(21) Appl. No.: 15/100,259

(22) PCT Filed: Oct. 28, 2014

(86) PCT No.: PCT/CN2014/089621
§ 371 (c)(1),
(2) Date: May 27, 2016

(87) PCT Pub. No.: WO2015/078251
PCT Pub. Date: Jun. 4, 2015

(65) Prior Publication Data
US 2017/0005976 A1    Jan. 5, 2017

(30) Foreign Application Priority Data
Nov. 27, 2013   (CN) .......................... 2013 1 0610711

(51) Int. Cl.
*G06F 15/16* (2006.01)
*H04L 12/58* (2006.01)
(Continued)

(52) U.S. Cl.
CPC ............. *H04L 51/32* (2013.01); *G06Q 50/01* (2013.01); *H04L 51/10* (2013.01); *H04L 67/26* (2013.01)

(58) Field of Classification Search
CPC ................................ H04L 51/32; G06C 50/01
(Continued)

(56) References Cited

U.S. PATENT DOCUMENTS

| 2011/0041082 | A1 | 2/2011 | Nguyen | |
| 2012/0272160 | A1* | 10/2012 | Spivack | G06Q 10/10 715/752 |

FOREIGN PATENT DOCUMENTS

| CN | 101005397 A | 7/2007 |
| CN | 101902490 A | 12/2010 |

(Continued)

OTHER PUBLICATIONS

The World Intellectual Property Organization (WIPO) International Search Report for PCT/CN2014/089621, dated Feb. 3, 2015.
(Continued)

*Primary Examiner* — Glenford J Madamba
(74) *Attorney, Agent, or Firm* — Anova Law Group, PLLC

(57) ABSTRACT

A method and system for aggregating user generated content (UGC) are disclosed. The method includes receiving a request for creating UGC, the request including content to be created and identification of a subject event; generating the UGC, the UGC being associated with the subject event; adding data related to the UGC to data describing the subject event; and sending data related to the subject event to users, including the UGC related to the subject event. Embodiments consistent with the present disclosure thus provide various aggregations of UGC associated with a subject event and improve user experience in social networking systems.

15 Claims, 7 Drawing Sheets

(51) Int. Cl.
*G06Q 50/00* (2012.01)
*H04L 29/08* (2006.01)

(58) Field of Classification Search
USPC .......................................... 709/206
See application file for complete search history.

(56) References Cited

FOREIGN PATENT DOCUMENTS

| | | |
|---|---|---|
| CN | 102117321 A | 7/2011 |
| CN | 103116589 A | 5/2013 |
| CN | 103188281 A | 7/2013 |

OTHER PUBLICATIONS

The State Intellectual Property Office of the People's Republic of China (SIPO) Office Action 1 for 201310610711.6 Aug. 27, 2018 7 Pages (including translation).

* cited by examiner

METHODS AND SYSTEMS FOR AGGREGATING USER GENERATED CONTENT

CROSS-REFERENCES TO RELATED APPLICATIONS

Related Applications

This application is based upon and claims the benefit of priority from Chinese Patent Application No. 201310610711.6 filed on Nov. 27, 2013, the entire content of which is incorporated herein by reference.

FIELD OF THE TECHNOLOGY

The present disclosure relates to internet technologies and, more particularly, to methods and systems for aggregating user generated content (UGC).

BACKGROUND

UGC refers to content that is originally created by a user and then shared with other users through various online platforms. Often a social networking platform uses a timeline based method to push contents to users in a user network. For example, a social networking platform may use a system to collect, store, and maintain contents related to users events. The system may also store the information related to certain topics of the users. When a user's event has new developments, such as new replies or new comments, the social networking platform may notify the user. When the user replies to or comment on another user's event, the social networking platform may notify the user when other users respond to his reply or comment. However, if a user is only a participant of an event, the social networking platform may not notify the user if entries generated by other users are added to the event. As a result, the contents pushed to the users by the social networking platform may be scattered. In one event thread, such scattered contents may cause the discussions to be incoherent. This type of social networking platforms lacks the mechanisms to organize common topics in an event, and may cause sporadic user experience and impair user interactions.

The disclosed method and system are directed to solve one or more problems set forth above and other problems.

BRIEF SUMMARY OF THE DISCLOSURE

Embodiments consistent with the present disclosure provide a method, system, mobile device, or a server for aggregating UGC.

One aspect of the present disclosure provides a method and system for aggregating UGC. The method includes receiving a request for creating UGC, the request including content to be created and identification of a subject event; generating the UGC, the UGC being associated with the subject event; adding data related to the UGC to data describing the subject event; and sending data related to the subject event to users, including UGCs related to the subject event.

Another aspect of the present disclosure provides a server for aggregating UGC. The server includes a content request interface module configured to receive a request for creating UGC, including content to be created and identification of a subject event; a Content creation module configured to generate the UGC, the UGC being associated with the subject event, and to add data related to the UGC to data describing the subject event; and a subject event transmitting module configured to send data related to the subject event to users, including UGCs related to the subject event.

Another aspect of the present disclosure provides a user terminal for aggregating UGC. The user terminal includes a content submission module configured to submit a request for creating UGC, including content to be created and identification of a subject event, to a server for aggregating UGC; wherein the server for aggregating UGC generates the UGC, the UGC being associated with the subject event, and to add data related to the UGC to data describing the subject event; and a subject event browsing module configured to receive a subject event data related to the subject event to users, including UGCs related to the subject event.

Another aspect of the present disclosure provides a system for aggregating UGC. The system includes a content management user terminal configured to submit a request for creating UGC including contents to be created and identification of a subject event; and a server for aggregating UGC configured to receive the request for creating the UGC including the content to be created and the identification of a subject event. The server is further configured to generate the UGC, the UGC being associated with the subject event; add data related to the UGC to data describing the subject event; and send data related to the subject event to users, including UGCs related to the subject event.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 9A:
FIG. 9*a* is another user interface of an embodiment consistent with the present disclosure.
Figure 9B:
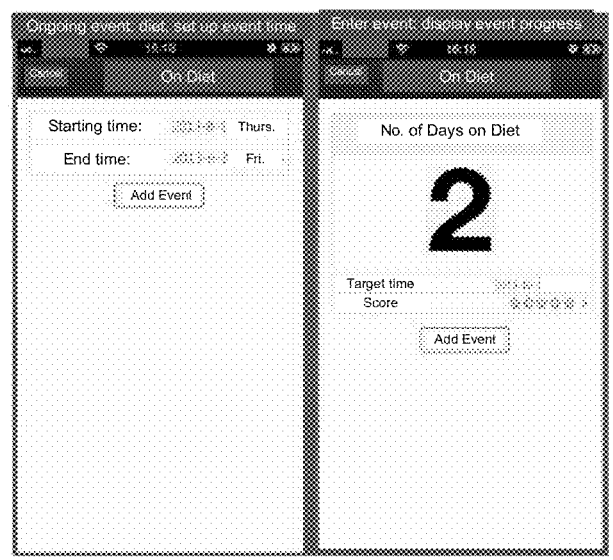
FIG. 9*b* is another user interface of an embodiment consistent with the present disclosure.

In the present disclosure, a server for aggregating UGC may manage the content related to different user events. The server may be an instant messaging server, a social networking system server, etc. A user may register through an instant messaging user terminal or a social networking user terminal, etc. The user may communicate with the server to manage the contents related to a user event. In the present disclosure, a subject event may be any event that a user can generate through the user terminal. For example, a subject event may be an interactive event, such as a birthday party; or an individual event, such as listening to music or participating in certain sports; or an on-going event, such as a going on trip or starting a diet, etc. FIG. 9a and FIG. 9b show two exemplary subject events. In FIG. 9a, a user may create a subject event for a friend's birthday, such as "Maruko's birthday." The user may set a time or a time period for the event and invite other users to participate in the event. In FIG. 9b, a user may create a subject event for getting on a diet, such as "On Diet." The user may set a time period for the event. Once the event is created, the user may enter the event to watch the progress of the event and self-monitor the event by entering a score, etc.

Further, in the present disclosure, UGC may be any content a user can generate by participating in a subject event. The UGC may not have a subject. Rather, the UGC is associated with the subject event. The UGC may be created when a user is commenting on the event, starting or participating in a thread related to the event, and/or interacting with other users related to the event.

Figure 1:
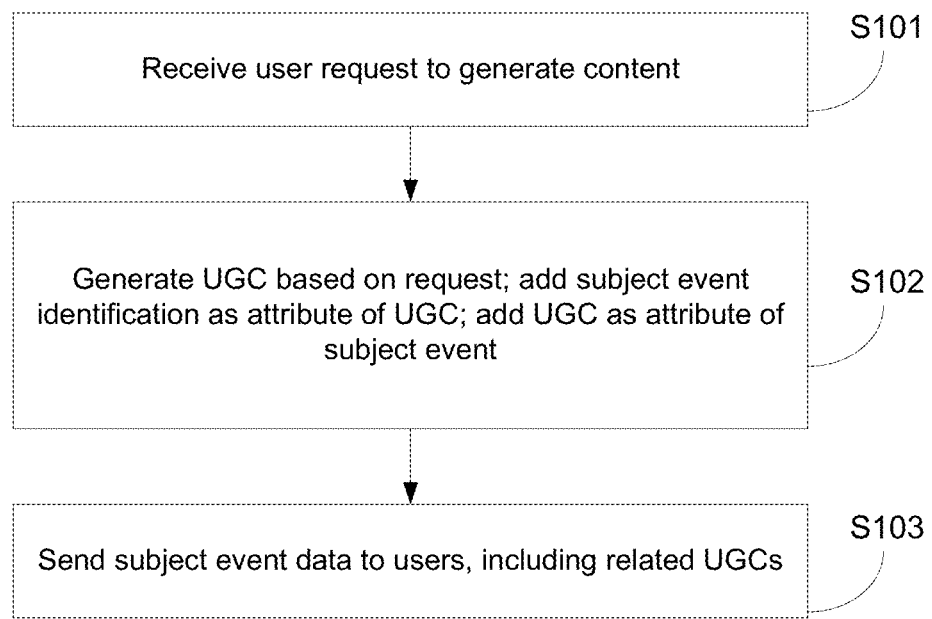
FIG. 1 is a flow chart of a method for aggregating UGC implemented by embodiments consistent with the present disclosure.

FIG. 1 shows a flow chart of a method for aggregating UGC. The method shown in FIG. 1 includes steps S101-S103.

Figure 2:
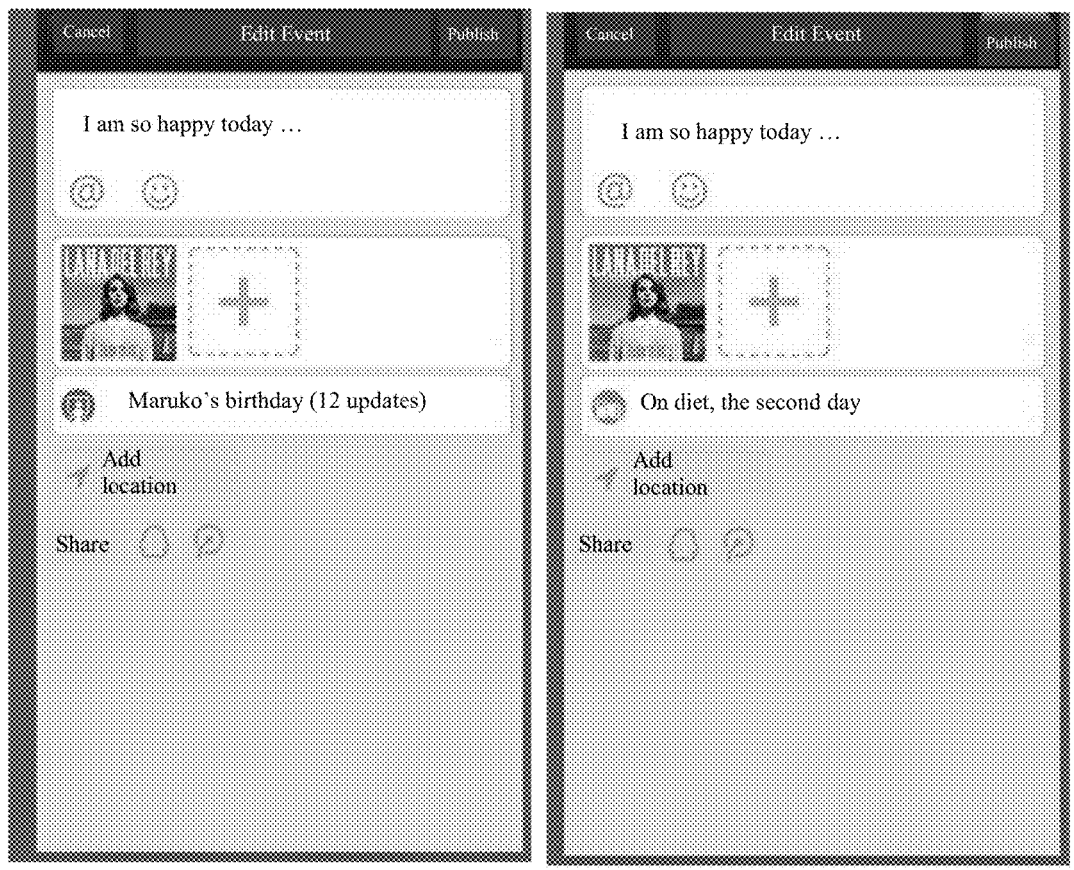
FIG. 2 is a user interface of an embodiment consistent with the present disclosure.

In step S101, the system for aggregating UGC may receive a user request to generate content. In one embodiment, the user may use a content management user terminal to submit the request to generate the content. FIG. 2 shows an exemplary user interface through which the user may send a request. The request may include the UGC and an identification of the subject event associated with the UGC. As shown in FIG. 2, the request to generate content may include the self-defined content submitted through the user interface, such as "I am so happy today . . . " or the uploaded image below that text. The data field below the image is the data entry point for the user to identify the subject event. The user may identify the name or the link of the subject event. Alternatively, when the user is browsing the subject event, he may select to participate in the event. The system may then jump to a webpage such as the one shown in FIG. 2. The user may then use the user interface to identify the subject event associated with the UGC.

For example, in FIG. 2, the left side page shows the subject event "Maruko's birthday (12 updates)." The right side page shows the subject event "On diet, the second day." The event identification may include a unique identifier of the event, such as an event number in a software system, or an event name, an event type, etc. The event identification may also include the user who originated the event. The system may later retrieve data related to users associated with the event. In one embodiment, the user interface may enable the user to enter location information, such as the location at which the user generated the relevant content. The user may further use the user interface to share the UGC or the subject event with users using other platforms, such as the Tencent WeChat, RenRen Net, Friend Net, Happytime Net, or other social networking platforms.

In step S102, the system for aggregating UGC may receive the request from the user and generate the UGC. The system may add the subject event identification as an attribute of the UGC. The system may also add the UGC as an attribute of the subject event.

Figure 3:
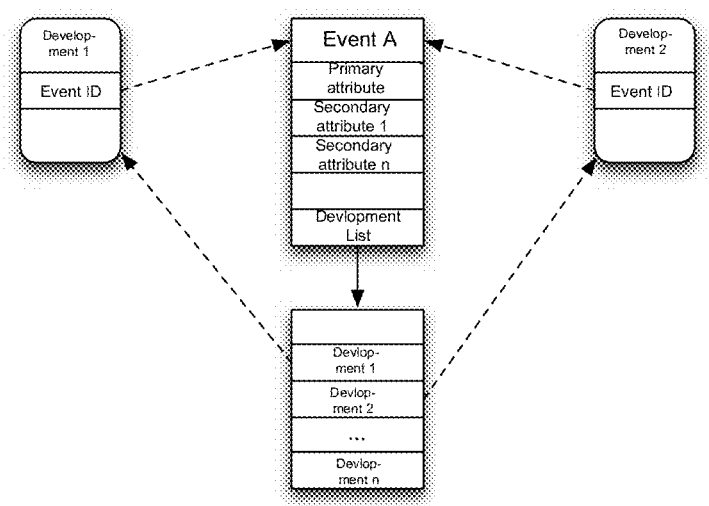
FIG. 3 is a block diagram illustrating data structure used in an embodiment consistent with the present disclosure.

In one embodiment, the system for aggregating UGC may receive a user request for creating UGC, store the UGC, associate the UGC with the user selected subject event, and associate the subject event with the UGC. FIG. 3 shows an exemplary data structure used by an exemplary system for aggregating UGC.

In FIG. 3, the left side data item "Development 1" is the UGC, the data item "Event ID" is the identification of the subject event the user is participating in. The system for aggregating UGC may add the submitted content to the attributes of the subject event. As shown in FIG. 3, the system may maintain a Development List for the subject event. The Development List may store all developments (UGC) and/or their identifications. In this example, the user associates the UGC Development 1 with subject event Event A. The system may then add identification of Event A into the attributes of Development 1. The system may also add identification of Development 1 to the Development List of Event A. If a second user creates Development 2, the system may then add the identification of Event A into the attributes of Development 2 and add identification of Development 2 to the attributes of Event A. The system for aggregating UGC may thus store the associations between the subject event and UGC in data related to the subject event as well as in data related to the UGC.

In step S103, when the system for aggregating UGC sends a subject event to users, it may send all developments, i.e. relevant UGCs, to the users. In one embodiment, the users receiving the subject event data may include the user who submitted a request for creating UGC in step S101 as well as other users. The system for aggregating UGC may push relevant subject events to users together with all of the associated UGC to the users. The system may thus enable the users to dynamically aggregate relevant UGC. The Development List associated with Event A, for example, may include the identification of users who generated the developments. A user may browse the content of the subject event Event A and easily access the users who has participated in Event A.

Figure 5:
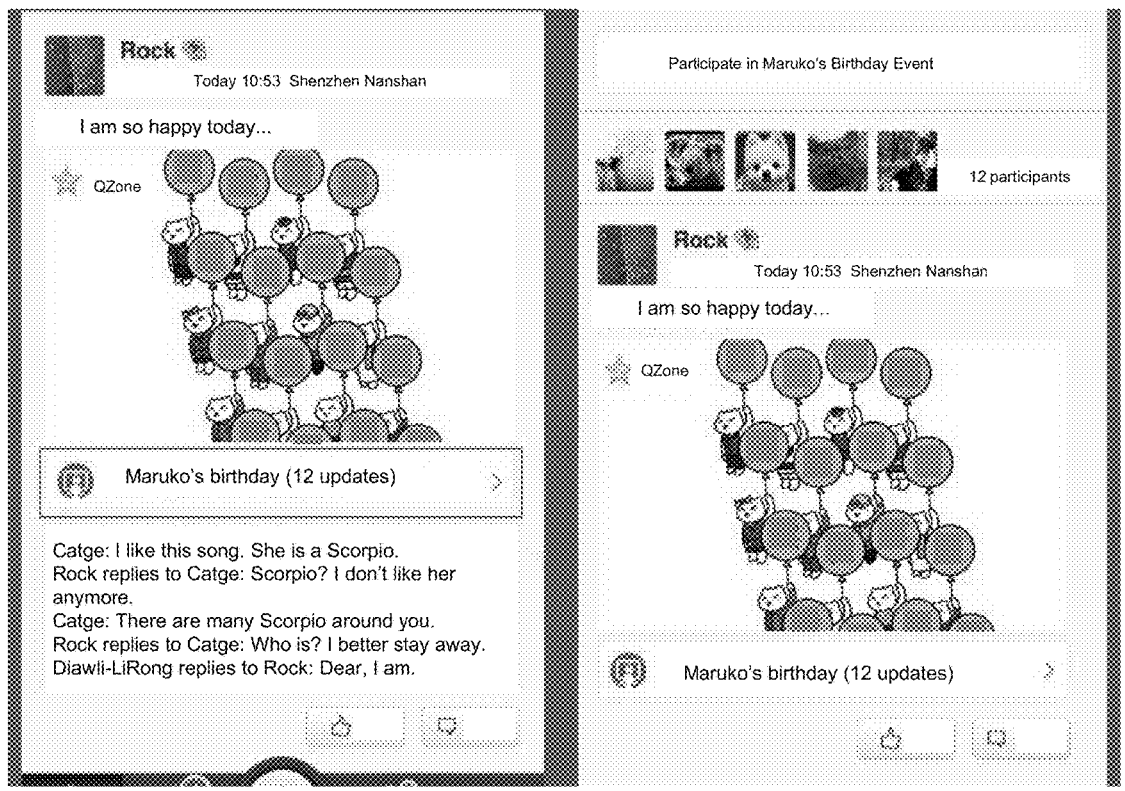
FIG. 5 is another user interface of an embodiment consistent with the present disclosure.

For example, a subject event may be "Maruko's birthday." A user may browse the event as shown in FIG. 5. The user interface in FIG. 5 shows the aggregated UGI "I am so happy today . . . " authored by Rock, which is included in the Development List of the event"Maruko's birthday." That is, the system for aggregating UGC may push all UGC associated with "Maruko's birthday" to all relevant users. The system may further store the user identification of the users who generated content (e.g., Rock) in the Development List of the subject event. The system may display the users who have participated in the subject events in the user interface.

In the method for aggregating UGC as shown in FIG. 1, a server for aggregating UGC may obtain a user request for creating UGC, store the UGC, add the UGC to the data describing the subject event, and add the subject event to the data describing the UGC. Embodiments consistent with the present disclosure aggregate UGC with related subject events to present the subject events with related UGCs. As a result, the users may understand the developments of the subject event, have coherent discussions about the subject event, and interact more effectively.

Figure 4:
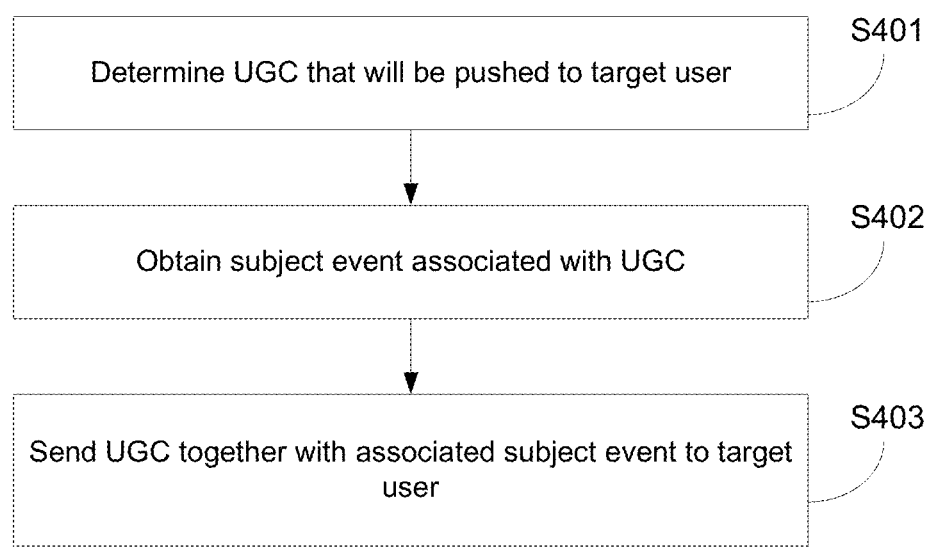
FIG. 4 is another flow chart of a method for aggregating UGC implemented by embodiments consistent with the present disclosure.

FIG. 4 shows another flow chart of a method for aggregating UGC consistent with the present disclosure. The method shown in FIG. 4 includes steps S401-S403.

In step S401, the server for aggregating UGC may determine the UGC that will be pushed to a target user. Specifically, the UGC may be originated by the target user. Alternatively, the UGC may be generated by other users who replied to, quoted, or participated in a subject event originated by the target user. The UGC may also be a link to another user's UGC. The server for aggregating UGC may push all UGC to users based on one or more pre-set conditions. The server may push the UGC that meets the conditions to the target user.

In step S402, the server may obtain the subject event associated with the UGC. Specifically, the server may determine the subject event associated with UGC using data structures as shown or similar to the one shown in FIG. 3.

In step S403, when the server sends the UGC to the target user, the server sends the associated subject event to the target user as well. Specifically, the user may receive the UGC and the associated subject event from the server. The user may view various aggregations of the UGC. FIG. 5 shows exemplary user interfaces showing aggregations of UGC. The server may confirm with the user that the UGC includes the content with the title of "I am so happy today . . . " created by Rock. The UGC may further include the image uploaded under the title line. The server may obtain the subject event associated with the UGC, in this example, "Maruko's birthday (12 updates)." The server may then send the UGC entitled "I am so happy today . . . " with the associated subject event "Maruko's birthday" to the user. The user may view the received data through a user interface as shown in FIG. 5.

Embodiments consistent with the present disclosure send UGC and the associated subject event to users. Embodiments consistent with the present disclosure enable users to exchange and comment on UGC associated with the subject event in real time. Embodiments consistent with the present disclosure thus enable users to communicate and aggregate information and improve the accumulation of UGC.

Figure 6:
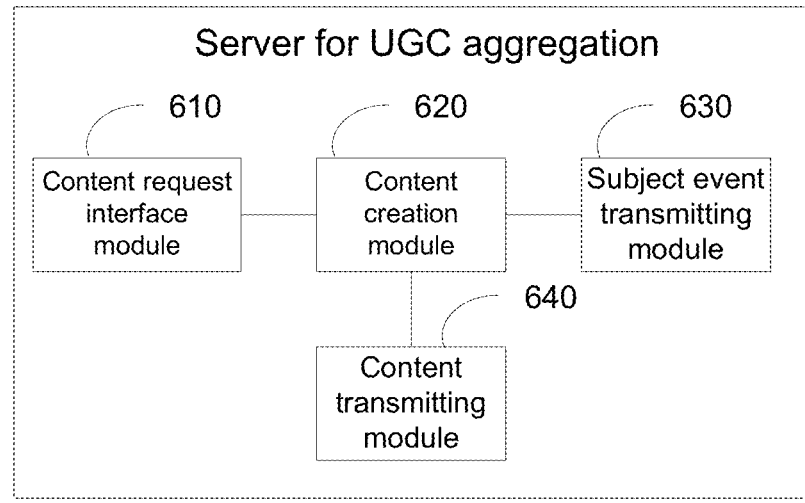
FIG. 6 is a diagram of an exemplary server for aggregating UGC consistent with the present disclosure.

FIG. 6 shows a server for aggregating UGC consistent with the present disclosure. The server may be an instant messaging system server, a SNS server, etc. As shown in FIG. 6, the server includes a content request interface module 610, a content creation module 620, and a subject event transmitting module 630, and a content transmitting module 640.

Specifically, the content request interface module 610 may receive a user request to create UGC. In one embodiment, the user may use a content management user terminal to submit the request to generate content. FIG. 2 shows an exemplary user interface through which the user may send a request. The request may include UGC and identification of the subject event associated with the UGC. As shown in FIG. 2, the request to generate content may include the self-defined content submitted through the user interface, such as "I am so happy today . . . " or the uploaded image below that line of text. The data field below the image is the data entry point for the user to identify the subject event. The user may identify the name or the link of the subject event. Alternatively, when the user is browsing the subject event, he may select to participate in the event. The system may then jump to a webpage such as the one shown in FIG. 2.

The user may then use the user interface to identify the subject event associated with the UGC.

For example, in FIG. 2, the left side page shows the subject event "Maruko's birthday (12 updates)." The right side page shows the subject event "On diet, the second day." The event identification may include a unique identifier of the event, such as an event number in a software system, or an event name, an event type, etc. The event identification may also include the user who originated the event. The system may later retrieve data related to the users associated with the event. In one embodiment, as shown in FIG. 2, the user interface may enable the user to enter location information, such as the location at which the user generated the relevant content. The user may further use the user interface to share the UGC or the subject event with users using other platforms, such as Tencent WeChat, RenRen Net, Friend Net, Happytime Net, or other social networking platforms.

The content creation module 620 may receive the request through the content request interface module 610 from the user and store the UGC. The content creation module 620 may add the subject event identification as an attribute of the UGC. The content creation module 620 may also add the UGC as an attribute of the subject event.

In one embodiment, the content creation module 620 may receive a user request for creating UGC, store the UGC, associate the UGC with the user selected subject event, and associated the subject event with the UGC. FIG. 3 shows an exemplary data structure used by the content creation module 620 for aggregating user content.

In FIG. 3, the left side data item Development 1 is the UGC, the data item "Event ID" is the identification of the subject event the user is participating in. The system for aggregating UGC may add the submitted UGC to the attributes of the subject event. As shown in FIG. 3, the system may maintain a Development List for subject events. The Development List may store all developments (UGC) and/or their identifications. In this example, the user associates the UGC Development 1 with subject event Event A. The system may then add identification of Event A as an attribute of Development 1. The system may also add identification of Development 1 to the Development List of Event A. If a second UGC Development 2 is generated, the system may then add the identification of Event A as an attribute of Development 2 and add identification of Development 2 as an attribute of Event A. The system for aggregating UGC may thus store the associations between a subject event and UGCs in data related to the subject event as well as in the data related to the UGCs.

When the system for aggregating UGC sends a subject event to users, the subject event transmitting module 630 may send all developments, i.e. relevant UGCs, to the users. In one embodiment, the users receiving the subject event data may include the user who submitted a request for creating UGC in step S101 as well as other users. The system for aggregating UGC may push relevant subject events to users together with all of the associated UGCs to the users. The system may thus enable the users to dynamically aggregate relevant UGC. The Development List associated with Event A, for example, may include identifications of users who generated the developments. A user may browse the content of the subject event Event A and easily access the users who has participated in Event A.

For example, the subject event may be "Maruko's birthday." A user may browse the event as shown in FIG. 5. The user interface in FIG. 5 shows the aggregated UGC "I am so happy today . . . " authored by Rock, which is included in the Development List of the event. That is, the subject event transmitting module 630 may push all UGC associated with "Maruko's birthday" to all relevant users. The subject event transmitting module 630 may further store the user identification of the user who generated content (e.g., Rock) in the Development List of the subject event. The system thus may display the users who participated in the subject event in the user interface.

In some embodiments, the server for aggregating UGC may include the content transmitting module 640. The content transmitting module 640 may determine to push content to a target user. Specifically, the UGC may be originated by the target user. Alternatively, the UGC may be generated by other users who replied to, quoted, or participated in a subject event originated by the target user. The UGC may also be a link to another user's generated content. The content transmitting module 640 may push all UGC based on one or more pre-set conditions. The content transmitting module 640 may push the UGC that meet the conditions to the target user.

The content transmitting module 640 may obtain the subject event associated with the UGC. Specifically, the content transmitting module 640 may determine the subject event associated with the UGC using data structures as shown or similar to the one shown in FIG. 3.

When the content transmitting module 640 sends the UGC to the target user, the server sends the associated subject event to the target user as well. Specifically, the user may receive the UGC and the associated subject event from the server. The user may view various aggregations of the UGC. FIG. 5 shows exemplary user interfaces showing aggregations of UGC. The server may confirm with the user that the UGC includes the content with the title of "I am so happy today . . . " created by Rock. The UGC may further include the image uploaded under that title line. The server may obtain the subject event associated with the UGC, in this example, "Maruko's birthday (12 updates)." The server may then send the UGC entitled "I am so happy today . . . " with the associated subject event "Maruko's birthday" to the user. The user may view the received data through a user interface as shown in FIG. 5.

Figure 7:
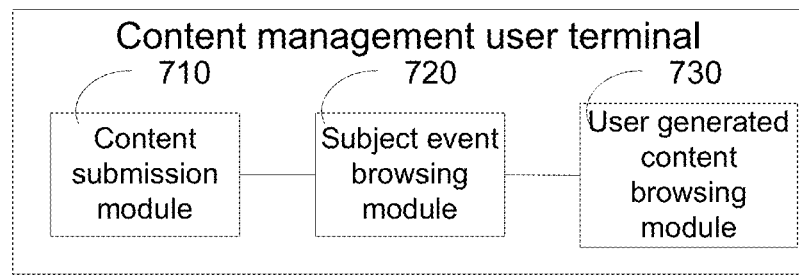
FIG. 7 is a diagram of an exemplary user terminal for aggregating UGC consistent with the present disclosure.

FIG. 7 shows an exemplary content management user terminal consistent with embodiments of the present disclosure. The user terminal may be an instant messaging user terminal, a SNS user terminal, or another user terminal with web-browsing capabilities. The user terminal shown in FIG. 7 includes a content submission module 710, a subject event browsing module 720, and a user generated content browsing module 730.

The content submission module 710 may submit a user request to generate content to the server for aggregating UGC. In one embodiment, the user may use a content management user terminal to submit the request to generate content. FIG. 2 shows an exemplary user interface through which the user may send a request. The request may include UGC and an identification of the subject event associated with the UGC. As shown in FIG. 2, the request to generate content may include the self-defined content submitted through the user interface, such as "I am so happy today . . . " or the uploaded image below that line of text. In FIG. 2, the data field below the image is the data entry point for the user to identify the subject event. The user may identify the name or the link of the subject event. Alternatively, when the user is browsing the subject event, he may select to participate into the event. The content submission module 710 may then jump to a webpage such as the one shown in FIG. 2. The user may then use the user interface to identify the subject event associated with the UGC.

For example, in FIG. 2, the left side page shows the subject event "Maruko's birthday (12 updates)." The right side page shows the subject event "On diet, the second day." The event identification may include a unique identifier of the event, such as an event number in a software system, or an event name, an event type, etc. The event identification may also include the user who originated the event. The system may later retrieve data related to users associated with the event. In one embodiment, the user interface may enable the user to enter location information, such as the location at which the user generated the relevant content. The user may further use the user interface to share the UGC or the subject event with users using other platforms, such as Tencent WeChat, RenRen Net, Friend Net, Happytime Net, or other social networking platforms.

For example, the subject event may be "Maruko's birthday." A user may browse the event as shown in FIG. 5. The user interface in FIG. 5 shows the aggregated UGC "I am so happy today . . . " authored by Rock, which is included in the Development List of the event. That is, the system for aggregating UGC may push all UGC associated with "Maruko's birthday" to all relevant users. The system may further store the user identification of the user who generated content (e.g., Rock) in the Development List of the subject event. The system thus may display the users who have participated in the subject events in the user interface.

In some embodiment, the content management user terminal may include the UGC browsing module 730. The UGC browsing module 730 may receive a subject event and the associated developments, i.e. relevant UGC, from the server. The UGC browsing module 730 may receive relevant subject events together with all of the associated UGC. The UGC module 730 enables the users to dynamically aggregate relevant UGC. The Development List associated with Event A, for example, may include identifications of users who generated the developments. A user may browse the content of the subject event Event A and easily access the users who has participated in Event A.

For example, the subject event may be "Maruko's birthday." A user may browse the event as shown in FIG. 5. The user interface in FIG. 5 shows the aggregated UGC "I am so happy today . . . " authored by Rock, which is included in the Development List of the event. That is, the system for aggregating UGC may push all UGC associated with "Maruko's birthday" to all relevant users. The system may further store the user identification of the user who generated content (Rock) in the Development List of the subject event. The UGC browsing module 730 may display the users who participated in the subject events in the user interface.

Figure 8:
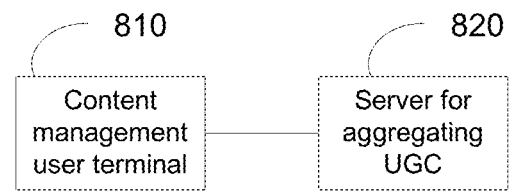
FIG. 8 is a diagram of an exemplary system for aggregating UGC consistent with the present disclosure.

FIG. 8 shows an exemplary system for aggregating UGC consistent with the present disclosure. The system includes a content management user terminal 810 and a server for aggregating UGC 820.

The content management user terminal 810 may submit a user request to generate content to the server for aggregating UGC 820. The request may include UGC and an identification of the subject event associated with the UGC. The user may identify the name or the link of the subject event. The server for aggregating UGC 820 may store the request for creating UGC, add associations with relevant subject event to the UGC, and add UGC to the data describing the subject event.

In the system for aggregating UGC shown in FIG. 8, a server for aggregating UGC may obtain a user request for creating UGC, store the UGC, add the UGC to the data describing the subject event, and add the subject event to the data describing the UGC. Embodiments consistent with the present disclosure aggregate UGC with related subject events to present the subject events with related UGC. As a result, the users may understand the developments of the subject event, have coherent discussions about the subject event, and interact more effectively.

Consistent with embodiments of the present disclosure, one or more non-transitory storage medium storing a computer program are provided to implement the system and method for aggregating UGC. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various systems aggregating UGC may be implemented. In one embodiment, a system for aggregating UGC may enable the user to associate multiple subject events to UGC. The system may associate multiple subject events with the UGC and associate each relevant subject event with the UGC. The system may then present the users with the relevant UGC with multiple associated subject events so that the user can browse and share the content easily with other users.

In another embodiment consistent with the present disclosure, a user may create a subject event in Qzone, which is a social networking website. The subject event may be going on a month-long diet entitled "Diet". A second user may send a request to the server for aggregating UGC to create new UGC related to the subject event "Diet." The request may include the content and the identification of the subject event "Diet." The UGC may include a photo image. The server for aggregating UGC may create the UGC and send the UGC to all users who were participants of the subject event "Diet." Other uses may them reply or comment on the photo in the UGC.

Embodiments consistent with the present disclosure aggregate UGC with related subject events to present the subject events with related items of UGC. As a result, the users may better understand the developments of the subject event. The present disclosure thus enables the users to have coherent discussions about the subject event, and interact more effectively.

What is claimed is:

1. A method for aggregating user generated content (UGC), comprising:
   receiving a first request for creating a first UGC, including a first content to be created and a first identification of a first subject event, from a first user;
   generating the first UGC, the first UGC being associated with the first subject event and including the first identification;
   receiving, from a second user, a second request for creating a second UGC, the second request including a second content to be created and a second identification of a second subject event;
   generating the second UGC, the second UGC being associated with the second subject event and including the second identification;
   when the first subject event is related to the second subject event, adding the first identification related to the first UGC to the second UGC, and adding the second identification related to the second UGC to the first UGC; and
   sending data related to the first subject event and the second subject event to the first user and the second user, the data including the first UGC and the second UGC associated with the first subject event and the second subject event.

2. The method according to claim 1, further comprising:
   adding the first identification of the first UGC and the second identification of the second UGC to a table listing data associated with the first subject event and the second subject event.

3. The method according to claim 2, wherein the first identification of the first UGC and the second identification of the second UGC include identification of the first user and the second user who authored the first UGC and the second UGC.

4. The method according to claim 1, wherein the first subject event is related to the second subject event when the first user or the second user identifies the first subject event with the second subject event.

5. A server for aggregating user generated content (UGC), comprising:
   a memory;
   a processor coupled to the memory, the processor being configured to
   receive a first request for creating a first UGC including a first content to be created and a first identification of a first subject event from a first user;
   generate the first UGC, the first UGC being associated with the first subject event and including the first identification;
   receive, from a second user, a second request for creating a second UGC, the second request including a second content to be created and a second identification of a second subject event;
   generate the second UGC, the second UGC being associated with the second subject event and including the second identification;
   when the first subject event is related to the second subject event, add the first identification related to the first UGC to the second UGC, and add the second identification related to the second UGC to the first UGC; and
   send data related to the first subject event and the second subject event to the first user and the second user, the data including the first UGC associated with the first subject event and the second subject event.

6. The server according to claim 5, wherein the processor is further configured to add the first identification of the first UGC and the second identification of the second UGC to a table listing data associated with the first subject event and the second subject event.

7. The server according to claim 6, wherein the first identification of the first UGC and the second identification of the second UGC include identification of the first user and the second user who authored the first UGC and the second UGC.

8. The server according to claim 5, wherein the first subject event is related to the second subject event when the first user or the second user identifies the first subject event with the second subject event.

9. A user terminal for aggregating user generated content (UGC), comprising:
   a memory;
   a processor coupled to the memory, the processor being configured to
   submit, by a first user, a first request for creating a first UGC, including a first content to be created and a first identification of a first subject event, to a server for aggregating UGCs; wherein the server for aggregating UGCs generates the first UGC, the first UGC being associated with the first subject event and including the first identification,
   submit, by a second user, a second request for creating a second UGC, the second request including a second content to be created and a second identification of a second subject event, to the server for aggregating UGCs; wherein the server for aggregating UGCs generates the second UGC, the second UGC being associated with the second subject event and including the second identification;
   when the first subject event is related to the second subject event, add the first identification related to the first UGC to the second UGC, and add the second identification related to the second UGC to the first UGC; and
   receive data related to the first subject event and the second subject event to the first user and the second user, including the first UGC associated with the first subject event and the second subject event.

10. The system according to claim 9, wherein the server for aggregating UGCs is further configured to add the first identification of the first UGC and the second identification of the second UGC to a table listing data associated with the first subject event and the second subject event.

11. The system according to claim 10, wherein the first identification of the first UGC and the second identification of the second UGC include identification of the first user and the second user who authored the first UGC and the second UGC.

12. The user terminal according to claim 9, wherein the first subject event is related to the second subject event when the first user or the second user identifies the first subject event with the second subject event.

13. A system for aggregating user generated content (UGC), comprising:
   a content management user terminal configured to submit a first request by a first user for creating a first UGC including a first content to be created and a first identification of a first subject event, and submit a second request by a second user for creating a second UGC, including a second content to be created and a second identification of a second subject event; and
   a server for aggregating UGCs configured to receive the first request for creating the first UGC including the first content to be created and the first identification of the first subject event, and receive the second request for creating the second UGC, including the second content to be created and the second identification of the second subject event; wherein the server is further configured to generate the first UGC, the first UGC being associated with the first subject event; generate the second UGC, the second UGC being associated with the second subject event;
   when the first subject event is related to the second subject event, add the first identification related to the first UGC to the second UGC, and adding the second identification related to the second UGC to the first UGC; and send data related to the first subject event and the second subject event to the first user and the second user, including the first UGC associated with the first subject event and the second subject event.

14. The system according to claim 13, wherein the first UGC or the second UGC includes a comment, an image, an audio message, or a video file.

15. The system according to claim 13, wherein the first subject event is related to the second subject event when the first user or the second user identifies the first subject event with the second subject event.

* * * * *